United States Patent
Rhoads et al.

(10) Patent No.: US 11,660,806 B2
(45) Date of Patent: May 30, 2023

(54) 3D PRINTED FLUOROPOLYMER-BASED ENERGETIC COMPOSITIONS

(71) Applicant: Purdue Research Foundation, West Lafayette, IN (US)

(72) Inventors: Jeffrey Frederick Rhoads, West Lafayette, IN (US); George Tsu-Chih Chiu, West Lafayette, IN (US); Ibrahim Emre Gunduz, West Lafayette, IN (US); Trevor John Fleck, West Lafayette, IN (US); Allison Kelly Murray, West Lafayette, IN (US); Steven Forrest Son, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 17/009,837

(22) Filed: Sep. 2, 2020

(65) Prior Publication Data

US 2020/0398479 A1    Dec. 24, 2020

Related U.S. Application Data

(62) Division of application No. 15/920,509, filed on Mar. 14, 2018, now Pat. No. 11,027,484.

(60) Provisional application No. 62/474,137, filed on Mar. 21, 2017.

(51) Int. Cl.
| | |
|---|---|
| *B29C 64/118* | (2017.01) |
| *B33Y 10/00* | (2015.01) |
| *C06B 21/00* | (2006.01) |
| *B29K 27/00* | (2006.01) |
| *B33Y 80/00* | (2015.01) |
| *C06B 27/00* | (2006.01) |
| *B33Y 70/10* | (2020.01) |
| *C09D 11/037* | (2014.01) |
| *C09D 11/106* | (2014.01) |
| *B29K 509/02* | (2006.01) |

(52) U.S. Cl.
CPC ............ *B29C 64/118* (2017.08); *B33Y 10/00* (2014.12); *B33Y 70/10* (2020.01); *B33Y 80/00* (2014.12); *C06B 21/0033* (2013.01); *C06B 27/00* (2013.01); *C09D 11/037* (2013.01); *C09D 11/106* (2013.01); *B29K 2027/16* (2013.01); *B29K 2509/02* (2013.01)

(58) Field of Classification Search
CPC ..... B33Y 80/00; B29K 2027/16; C06B 27/00; B29C 64/118
See application file for complete search history.

(56) References Cited

U.S. PATENT DOCUMENTS

| | | | |
|---|---|---|---|
| 2018/0237627 A1* | 8/2018 | Liu | ........................ B29C 64/118 |
| 2018/0370119 A1 | 12/2018 | Spence et al. | |
| 2019/0344496 A1* | 11/2019 | Bartow | ..................... C08K 7/28 |

OTHER PUBLICATIONS

Huang, C., et al., Electrospray Deposition of Energetic Polymer Nanocomposites with High Mass Particle Loadings: A Prelude to 3D Printing of Rocket Motors, Advanced Engineering Materials, 2015, 17, No. 1, 95-101.

* cited by examiner

*Primary Examiner* — Xiao S Zhao
*Assistant Examiner* — John J DeRusso
(74) *Attorney, Agent, or Firm* — Purdue Research Foundation

(57) ABSTRACT

Three-dimensional (3D) printed fluoropolymer-based energetic compositions are made using 3D printing methods. The 3D printed fluoropolymer-based energetic compositions comprise a fluoropolymer and a reactive metal or metal oxide. The total weight percentage of the fluoropolymer and the reactive metal or metal oxide is 70-100% of the 3D printed fluoropolymer-based energetic composition, and the weight percentage of the reactive metal or metal oxide is 5-85 wt % of the total weight of the 3D printed fluoropolymer-based energetic material. The 3D printed fluoropolymer-based energetic material has a thickness of at least 200 μm.

9 Claims, No Drawings

3D PRINTED FLUOROPOLYMER-BASED ENERGETIC COMPOSITIONS

CROSS-REFERENCE TO RELATED APPLICATION

The present U.S. patent application is a divisional application is U.S. patent application Ser. No. 15/920,509, filed Mar. 14, 2018, now U.S. Pat. No. 11,027,484, and is related to and claims the priority benefit of U.S. Provisional Application No. 62/474,137, filed Mar. 21, 2017, the contents each of which is hereby incorporated by reference in its entirety into this application.

TECHNICAL FIELD

The present disclosure relates to three-dimensional (3D) printed fluoropolymer-based energetic compositions and 3D printing methods for making the 3D printed fluoropolymer-based energetic compositions.

BACKGROUND

This section introduces aspects that may help facilitate a better understanding of the disclosure. Accordingly, these statements are to be read in this light and are not to be understood as admissions about what is or is not prior art.

Polymer composites containing reactive metal (e.g., aluminum) are of extreme importance in propellants, such as the solid rocket motors used in the space shuttle. Ideally, the polymer as a binder needs to not only provide mechanical integrity, but also participate in a favorable manner in the overall energy release chemistry. Fluorine-containing polymers may offer a delivery method as a binder and a strong oxidizer.

One of the challenges in the use of energetic particles within a polymer matrix is the difficulty in processing by traditional mixing methods. One common method includes powder compaction, which involves the mixing of the metal particles with the polymer powder(s) in a solvent, followed by evaporation of the solvent and mechanical compression of the mixed powders into pellet form. Other common methods include melt blending and solution mixing.

However, these methods share a number of limitations and drawbacks. The resulting compositions generally possess lower chemical and/or physical interaction between the individual component particles (polymer-metal and polymer-polymer), and the metal particles are often unevenly distributed throughout the polymer matrix. Both of these problems may lead to a composite that fails to achieve adequate mechanical properties for many practical applications.

To overcome the drawbacks, some additional methods such as ink printing or Electrospray deposition (ESD) have been disclosed. See Chuan Huang et al., Electrospray Deposition of Energetic Polymer Nanocomposites with High Mass Particle Loadings: A Prelude to 3D Printing of Rocket Motors, Advanced Engineering Materials, 2015, 17, No. 1, 95-101. Although ESD method can provide the composition of energetic materials comprising polyvinylidene fluoride (PVDF) and aluminum particles, so far, such composition can only be prepared as thin films. The film prepared by Chuan Huang et al. has a very thin thickness of 170 µm.

There is still a need to develop other methods for a more efficient process that can provide a better energetic product for more realistic utilities.

SUMMARY

One of the primary objectives of the present disclosure is to provide a feasible 3D printing method to prepare a 3D printed fluoropolymer-based energetic material which may be used as a multifunctional reactive structure.

In one embodiment, the present disclosure provides:

A 3D printed fluoropolymer-based energetic material comprising a fluoropolymer and a reactive metal or metal oxide, wherein the 3D printed fluoropolymer-based energetic material is printed by a 3D printing method for a fluoropolymer-based energetic material, wherein the method comprises:

a) preparing a fluoropolymer-based energetic material pellet, wherein the fluoropolymer-based energetic material pellet comprises at least a fluoropolymer as an oxidizer and at least a reactive metal or metal oxide;

b) preparing a fluoropolymer-based energetic material filament by adding the fluoropolymer-based energetic material pellet to a filament extruder; and c) 3D printing the fluoropolymer-based energetic material filament to provide a 3D printed fluoropolymer-based energetic material at a temperature below the onset to reaction temperature of the fluoropolymer, wherein the total weight percentage of the fluoropolymer and the reactive metal or metal oxide is 70-100% of the 3D printed fluoropolymer-based energetic material, and the weight percentage of the reactive metal or metal oxide is 5-85 wt % of the total weight of the 3D printed fluoropolymer-based energetic material.

In one embodiment, the present disclosure provides:

A 3D printing method to prepare a 3D printed fluoropolymer-based energetic material, wherein the method comprises:

a) preparing a fluoropolymer-based energetic material pellet, wherein the fluoropolymer-based energetic material pellet comprises at least a fluoropolymer as an oxidizer and at least a reactive metal or metal oxide;

b) preparing a fluoropolymer-based energetic material filament by adding the fluoropolymer-based energetic material pellet to a filament extruder; and c) 3D printing the fluoropolymer-based energetic material filament to provide a 3D printed fluoropolymer-based energetic material at a temperature below the onset to reaction temperature of the fluoropolymer, wherein the total weight percentage of the fluoropolymer and the reactive metal or metal oxide is 70-100% of the 3D printed fluoropolymer-based energetic material, and the weight percentage of the reactive metal or metal oxide is 5-85 wt % of the total weight of the 3D printed fluoropolymer-based energetic material.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure the term "about" can allow for a degree of variability in a value or range, for example, within 10%, within 5%, or within 1% of a stated value or of a stated limit of a range.

In the present disclosure the term "substantially" can allow for a degree of variability in a value or range, for example, within 90%, within 95%, or within 99% of a stated value or of a stated limit of a range.

Although there are some efforts of preparing energetic materials such as PVDF/Al compositions, for example, Chuan Huang et al. disclosed an ESD method to prepare PVDF/Al composition in very thin films, Chuan Huang et al. did also recognize the limitation of the ESD method by making a statement that "[T]he use of this approach is a prelude to what might evolve into a 3D printing approach for propellants".

Therefore, one of the primary objectives of the present disclosure is to provide a feasible 3D printing method to prepare a fluoropolymer-based energetic material which may be used as a multifunctional reactive structure.

In one embodiment, the present disclosure provides:

A 3D printed fluoropolymer-based energetic material comprising a fluoropolymer and a reactive metal or metal oxide, wherein the 3D fluoropolymer-based energetic material is printed by a 3D printing method, wherein the method comprises:
a) preparing a fluoropolymer-based energetic material pellet, wherein the fluoropolymer-based energetic material pellet comprises at least a fluoropolymer as an oxidizer and at least a reactive metal or metal oxide;
b) preparing a fluoropolymer-based energetic material filament by adding the fluoropolymer-based energetic material pellet to a filament extruder; and
c) 3D printing the fluoropolymer-based energetic material filament to provide a 3D printed fluoropolymer-based energetic material at a temperature below the onset to reaction temperature of the fluoropolymer,
wherein the total weight percentage of the fluoropolymer and the reactive metal or metal oxide is 70-100% of the 3D printed fluoropolymer-based energetic material, and the weight percentage of the reactive metal or metal oxide is 5-85 wt % of the total weight of the 3D printed fluoropolymer-based energetic material.

In one embodiment, the present disclosure provides:

A 3D printing method to prepare a 3D printed fluoropolymer-based energetic material, wherein the method comprises:
a) preparing a fluoropolymer-based energetic material pellet, wherein the fluoropolymer-based energetic material pellet comprises at least a fluoropolymer as an oxidizer and at least a reactive metal or metal oxide;
b) preparing a fluoropolymer-based energetic material filament by adding the fluoropolymer-based energetic material pellet to a filament extruder; and
c) 3D printing the fluoropolymer-based energetic material filament to provide a 3D printed fluoropolymer-based energetic material at a temperature below the onset to reaction temperature of the fluoropolymer,
wherein the total weight percentage of the fluoropolymer and the reactive metal or metal oxide is 70-100% of the 3D printed fluoropolymer-based energetic material, and the weight percentage of the reactive metal or metal oxide is 5-85 wt % of the total weight of the 3D printed fluoropolymer-based energetic material.

In one embodiment, the present disclosure provides that the fluoropolymer may be selected from but is not limited to PVF (polyvinylfluoride), PVDF (polyvinylidene fluoride), PTFE (polytetrafluoroethylene), PCTFE (polychlorotrifluoroethylene), PFA (perfluoroalkoxy polymer), [P(VDF-TrFE)] (poly(vinylidene fluoride-trifluoroethylene)), [P(VDF-TrFE-CFE)] (poly(vinylidene fluoride-trifluoroethylene-chlorofluoroethylene)), THV (a polymer of tetrafluoroethylene, hexafluoropropylene and vinylidene fluoride), FEP (fluorinated ethylene-propylene), ETFE (polyethylenetetrafluoroethylene), HTE (a polymer of hexafluoropropylene, tetrafluoroethylene and ethylene), ECTFE (polyethylenechlorotrifluoroethylene), FFPM/FFKM (perfluorinated elastomer), FPM/FKM (fluorocarbon [chlorotrifluoroethylenevinylidene fluoride]), FEPM (fluoroelastomer [tetrafluoroethylene-propylene]), PFPE (perfluoropolyether), PFSA (perfluorosulfonic acid), or any combination thereof.

In one embodiment, the present disclosure provides that the fluoropolymer has a weight percentage range of 20-95 wt % of the total weight of the 3D printed fluoropolymer-based energetic material. In one embodiment, the range is 30-85 wt %. In one embodiment, the range is 40-85 wt %. In one embodiment, the range is 50-85 wt %. In one embodiment, the range is 60-85 wt %.

In one embodiment, the present disclosure provides that the fluoropolymer is PVDF.

In one embodiment, the present disclosure provides that the PVDF has a weight percentage range of 20-95 wt % of the total weight of the 3D printed PVDF-based energetic material. In one embodiment, the range is 30-80 wt %. In one embodiment, the range is 40-85 wt %. In one embodiment, the range is 50-85 wt %. In one embodiment, the range is 60-85 wt %.

In one embodiment, the present disclosure provides that the reactive metal or metal oxide may be selected from but is not limited to lithium, boron, sodium, magnesium, aluminum, silicon, calcium, titanium, vanadium, chromium, manganese, iron, cobalt, nickel, copper, zinc, gallium, yttrium, zirconium, niobium, molybdenum, ruthenium, rhodium, palladium, silver, cadmium, indium, tin, antimony, iodine, cesium, barium, hafnium, tantalum, tungsten, platinum, gold, mercury, lead, bismuth or any oxides of the metals, or any combination thereof.

In one embodiment, the present disclosure provides that the reactive metal or metal oxide has a weight percentage range of 5-85 wt % of the total weight of the 3D printed fluoropolymer-based energetic material. In one embodiment, the range is 10-85 wt %. In one embodiment, the range is 20-85 wt %. In one embodiment, the range is 30-85 wt %. In one embodiment, the range is 40-85 wt %. In one embodiment, the range is 5-70 wt %. In one embodiment, the range is 10-70 wt %. In one embodiment, the range is 20-70 wt %. In one embodiment, the range is 30-70 wt %. In one embodiment, the range is 40-70 wt %. In one embodiment, the range is 10-60 wt %. In one embodiment, the range is 10-50 wt %. In one embodiment, the range is 10-40 wt %.

In one embodiment, the present disclosure provides that the reactive metal is aluminum.

In one embodiment, the present disclosure provides that the reactive metal or metal oxide is aluminum and has a weight percentage range of 5-85 wt % of the total weight of the 3D printed fluoropolymer-based energetic material. In one embodiment, the range is 10-85 wt %. In one embodiment, the range is 20-85 wt %. In one embodiment, the range is 30-85 wt %. In one embodiment, the range is 40-85 wt %. In one embodiment, the range is 5-70 wt %. In one embodiment, the range is 10-70 wt %. In one embodiment, the range is 20-70 wt %. In one embodiment, the range is 30-70 wt %. In one embodiment, the range is 40-70 wt. In one embodiment, the range is 10-60 wt %. In one embodiment, the range is 10-50 wt %. In one embodiment, the range is 10-40 wt %.

In one embodiment, the present disclosure provides that the reactive metal or metal oxide has a particle size range of 100 μm to 0.01 nm. In one embodiment, the particle size range is 10.0 µm to 0.1 nm. In one embodiment, the particle size range is 1.0 µm to 1.0 nm.

In one embodiment, the present disclosure provides a 3D printing method to prepare a 3D printed fluoropolymer-based energetic material, wherein the printing speed is not higher than 1000 mm/s. In one embodiment, the printing speed is not higher than 100 mm/s. In one embodiment, the printing speed is not higher than 10 mm/s. In one embodiment, the printing speed is between 0.01 mm/s to 1000 mm/s. In one embodiment, the printing speed is between 0.01 mm/s to 100 mm/s. In one embodiment, the printing speed is between 0.01 mm/s to 10 mm/s. In one embodiment, the printing speed is between 0.1 mm/s to 1000 mm/s. In one embodiment, the printing speed is between 0.1 mm/s to 100 mm/s. In one embodiment, the printing speed is between 0.1 mm/s to 10 mm/s. In one embodiment, the printing speed is between 1.0 mm/s to 1000 mm/s. In one embodiment, the printing speed is between 1.0 mm/s to 100 mm/s. In one embodiment, the printing speed is between 1.0 mm/s to 50 mm/s. In one embodiment, the printing speed is between 1.0 mm/s to 20 mm/s. In one embodiment, the printing speed is between 1.0 mm/s to 10 mm/s.

In one embodiment, the present disclosure provides a 3D printing method to prepare a 3D printed fluoropolymer-based energetic material and a 3D printed fluoropolymer-based energetic material, wherein the layer height is between 0.01-5.0 mm. In one embodiment, the layer height is between 0.01-2.5 mm. In one embodiment, the layer height is between 0.01-1.0 mm. In one embodiment, the layer height is between 0.1-5.0 mm. In one embodiment, the layer height is between 0.1-2.5 mm. In one embodiment, the layer height is between 0.1-1.0 mm. In one embodiment, the layer height is between 0.2-5.0 mm. In one embodiment, the layer height is between 0.2-2.5 mm. In one embodiment, the layer height is between 0.2-1.0 mm.

In one embodiment, the present disclosure provides a 3D printing method to prepare a 3D printed fluoropolymer-based energetic material and a 3D printed fluoropolymer-based energetic material, wherein the filament diameter is between 0.1-25 mm. In one embodiment, the filament diameter is between 0.1-10 mm. In one embodiment, the filament diameter is between 0.1-5 mm. In one embodiment, the filament diameter is between 1.0-25 mm. In one embodiment, the filament diameter is between 1.0-10 mm. In one embodiment, the filament diameter is between 1.0-5.0 mm. In one embodiment, the filament diameter is between 1.0-2.0 mm.

In one embodiment, the present disclosure provides a 3D printing method to prepare a 3D printed fluoropolymer-based energetic material and a 3D printed fluoropolymer-based energetic material, wherein the 3D printed fluoropolymer-based energetic material has a thickness of at least 200 µm, at least 500 µm, at least 1 mm, at least 10 mm. In one embodiment, the thickness is 200 µm-1.0 m, 500 µm-1.0 m, 1.0 mm-1.0 m, 200 µm-0.5 m, 500 µm-0.5 m, 1.0 mm-0.5 m, 200 µm-0.25 m, 500 µm-0.25 m, 1.0 mm-0.25 m, 200 µm-0.1 m, 500 µm-0.1 m.

In one embodiment, the present disclosure provides a 3D printing method to prepare a 3D printed fluoropolymer-based energetic material and a 3D printed fluoropolymer-based energetic material, wherein the total weight percentage of the fluoropolymer and the reactive metal or metal oxide is 90-100% of the 3D printed fluoropolymer-based energetic material, and the weight percentage of the reactive metal or metal oxide is 10-50 wt % of the total weight of the 3D printed fluoropolymer-based energetic material.

In one embodiment, the present disclosure provides a 3D printing method to prepare a 3D printed fluoropolymer-based energetic material and a 3D printed fluoropolymer-based energetic material, wherein the total weight percentage of the fluoropolymer and the reactive metal or metal oxide is 95-100% of the 3D printed fluoropolymer-based energetic material, and the weight percentage of the reactive metal or metal oxide is 15-25 wt % of the total weight of the 3D printed fluoropolymer-based energetic material.

In one embodiment, the present disclosure provides a 3D printing method to prepare a 3D printed fluoropolymer-based energetic material and a 3D printed fluoropolymer-based energetic material, wherein the fluoropolymer is dissolved in at least one organic solvent. In one embodiment, at least one organic solvent may be but is not limited to ketones and/or alcohols. In one embodiment, the at least one organic solvent is acetone.

In one embodiment, the present disclosure provides a 3D printing method to prepare a 3D printed fluoropolymer-based energetic material and a 3D printed fluoropolymer-based energetic material, wherein the 3D printing is carried out at a temperature between the melting point and the onset to reaction temperature of the fluoropolymer.

In one embodiment, the present disclosure provides a 3D printing method to prepare a 3D printed fluoropolymer-based energetic material, wherein the 3D printing method is fused deposition modeling (FDM).

In one embodiment, the present disclosure provides a 3D printing method to prepare a 3D printed fluoropolymer-based energetic material and a 3D printed fluoropolymer-based energetic material, wherein a contact promoting agent such as a glue stick may be used to ensure proper build plate adhesion during the 3D printing process due to the non-stick nature of the fluoropolymer base of the material.

In one embodiment, the present disclosure provides a 3D printing method to prepare a 3D printed fluoropolymer-based energetic material and a 3D printed fluoropolymer-based energetic material, wherein the 3D printed fluoropolymer-based energetic material is substantially free of acrylonitrile butadiene styrene (ABS).

Example 1: A Three-Step 3D Printing Method for to Prepare a Fluoropolymer-Based Energetic Material A 3D printing method to prepare a 3D printed fluoropolymer-based energetic material is illustrated by the following three-step 3D printing method.

Step 1: Pellet Preparation

The first step in 3D printing the Al/PVDF energetic material was formulating pellets to be used in the filament making process. Agglomerate PVDF (Kynar 711) was dissolved in a co-solvent of acetone (Sunnyside Specialty Chemicals) and dimethylformamide (DMF) (Anhydrous 99.8%, Sigma Aldrich) to create a polymer precursor. For every gram of total material, 7 mL of solvent was used to create a precursor suitable for mixing in a digital sonifier (Branson Ultrasonics). A typical batch consisted of dissolving 0.8 g of PVDF in 2 mL of DMF and 5 mL of acetone. This solution was then mixed for 40 s in four intervals on a vortex mixer (Fisher Scientific) to ensure the agglomerate PVDF was completely dissolved. Then, 0.2 g of Al particles (H3, Valimet Inc.) was added to the solution prior to loading it in the digital sonifier (Branson Ultrasonics) such that the probe was 1 cm from the bottom of the 30 mL glass vial. The solution was mixed at an amplitude of 15% for 5 min. After mixing, the material was poured into a metal weigh tin to dry. After the material was dried for approximately 48 hours, it was cut into pellet form to be fed into the filament extruder.

Step 2: Filament Preparation

A filament extruder (Filabot, Original Filament Extruder) was used to extrude the Al/PVDF pellets into a 3D printable filament. When handling energetic materials, potential safety hazards are present and need to be addressed. In order to extrude the pellets into a filament, the Filabot extruder applies both heat and pressure to the material using a feed screw and a heated chamber. In this part of the process, heat, pressure and confinement are applied to the energetic material. Therefore, as a precaution, the extrusion process was modified and operated remotely, being controlled from a separate room. Energetic pellets were added to the extruder hopper followed by inert PVDF pellets. After 10 min of extrusion, excess amounts of the Filabot's extruder purge compound were added. This allowed for the energetic material to be extruded and then replaced by inert material, all while no direct human interaction occurred.

Due to the extrusion process being controlled remotely, filament diameter was more difficult to control. With no tension controller in place, the resultant filament was consistently oversized. In order to counteract this, a 1.60 mm nozzle was placed on the filament extruder in an attempt to keep the filament diameter below 1.75 mm. After extrusion was complete, only sections with consistent filament diameter were used for experimentation (80% of total filament extruded was used).

Step 3: 3D Printing

A variety of samples were printed using a Makerbot Replicator 2× FDM printer. The important factors may be adjusting the layer height (about 0.2 mm for the examples prepared) and using a slower printing speed (about 10 mm/s for the examples prepared) due to the low melt flow index of PVDF. The slower print speed allowed for the filament controller to apply enough pressure to achieve the necessary bead size. It should also be noted that the filament diameter needed to be measured and adjusted in the software to account for the undersized filament sections. The printing temperature was set below the decomposition onset temperature of PVDF (about 375° C.) to ensure the safety and better quality of the printed product. If the temperature was kept below 310° C. during the printing and extrusion process, no meaningful alteration of the printed materials likely will occur. The temperature used for the example is about 240° C.

For the additive manufacturing of an energetic material to be successful using FDM techniques, process parameters need to be controlled carefully throughout all three steps of this process. If not, the variation of parameters could compound into unpredictable printing performance which would lead to inconsistent combustion performance, effectively limiting the functionality of the material.

The results in the following sections highlight the importance of having a repeatable printing process and its influence on the combustion performance of printed energetic materials.

Energetic Performance of Extruded Filaments

In order to ensure repeatable and predictable combustion performance of the printed samples, the energetic filament needs to be consistent from batch-to-batch, especially due to the hazards of processing large amounts of material at one time. Any filament inconsistencies may be compounded by the printing process.

Burning rate measurements have been widely used as a metric of combustion performance, and it is a suitable method for evaluating filament consistency. Therefore, three inch segments of filament from two different batches were burned and videos of the deflagration events were obtained in order to measure burn rates. The repeatability results are summarized in Table 1.

TABLE 1

Repeatability of the filament burning rates from batch to batch

| Batch | Sample size | Average Diameter | Average Burn Rate | St. Deviation |
|---|---|---|---|---|
| 1 | 6 samples | 1.53 mm | 18.7 mm/s | 1.3 mm/s |
| 2 | 5 samples | 1.42 mm | 15.0 mm/s | 0.3 mm/s |

Videos of the deflagration events demonstrate a constant deflagration rate as the flame front propagates down the filament. This, paired with the results shown in Table 1, show that the filament burning rates are fairly repeatable within the different parts of the filament as well as from batch to batch. While there is a difference in the average burn rate from Batch 1 to Batch 2, this can be attributed to measurement method inaccuracies, as well as other parameter inconsistencies, such as a slight variance (+/−0.15 mm) in filament diameter across all of the samples.

Printing Performance of 3D Printed Samples

One major concern with the additive manufacturing of energetic materials is how printing inconsistencies will affect the combustion performance. The suboptimal print settings and defects may lead to inconsistent combustion performance. Ideally, the material would have a thin flame front propagating through the material at a constant speed.

Table 2 compares the results of the propagation speeds of printed samples with the filament propagation speed and shows that the performance of the printed samples were very comparable (within the standard deviation) with the unprinted material.

TABLE 2

Comparison of Printed Lines versus the Filaments

| Sample | Sample size | Average Diameter | Average Burn Rate | St. Deviation |
|---|---|---|---|---|
| Filaments | 11 samples | 1.48 mm | 17.03 mm/s | 2.15 mm/s |
| Printed Lines | 4 samples | 1.52 mm | 18.51 mm/s | 2.20 mm/s |

Once proper print settings were found to ensure reliable combustion performance, larger samples were printed. These samples have relatively good quality as compared to ABS samples. The larger 3D printed energetic material was able to deflagrate in a similar manner as the filaments.

Therefore, the present disclosure provides a process to create an energetic filament and 3D print the energetic filament safely. In addition, the materials printed by the unique 3D printing method of the present disclosure can maintain consistent combustion performance that is comparable with standard materials such as ABS.

Those skilled in the art will recognize that numerous modifications can be made to the specific implementations described above. The implementations should not be limited to the particular limitations described. Other implementations may be possible.

The invention claimed is:

1. A 3D printing method for a polyvinylidene fluoride (PVDF)-based energetic material, wherein the method comprises:

a) preparing a polyvinylidene fluoride (PVDF)-based energetic material that consists essentially of polyvinylidene fluoride (PVDF) and aluminum;
b) preparing a polyvinylidene fluoride (PVDF)-based energetic material filament by adding the polyvinylidene fluoride (PVDF)-based energetic material to a filament extruder; and
c) 3D printing the polyvinylidene fluoride (PVDF)-based energetic material filament to provide a 3D printed polyvinylidene fluoride (PVDF)-based energetic material at a temperature below the onset to reaction temperature of polyvinylidene fluoride (PVDF);
wherein the 3D printed polyvinylidene fluoride (PVDF)-based energetic material is substantially free of any other polymer.

2. The method of claim 1, wherein the 3D printed polyvinylidene fluoride (PVDF)-based energetic material has a layer height of 0.1-2.5 mm.

3. The method of claim 1, wherein the 3D printing is carried out with a printing speed of 1-20 mm/s.

4. The method of claim 1, wherein the polyvinylidene fluoride (PVDF)-based energetic material filament has a diameter of 1-5 mm.

5. The method of claim 1, wherein the 3D printing is carried out at a temperature between the melting point and the onset to reaction temperature of the polyvinylidene fluoride (PVDF).

6. The method of claim 5, wherein the 3D printing is carried out at a temperature below 310° C.

7. The method of claim 1, wherein the 3D printing method is fused deposition modeling (FDM).

8. The method of claim 1, wherein the polyvinylidene fluoride (PVDF)-based energetic material is prepared as a pellet.

9. The method of claim 1, wherein the total weight percentage of PVDF and aluminum is 95-100% of the 3D printed polyvinylidene fluoride (PVDF)-based energetic material, and the weight percentage of aluminum is 15-25 wt % of the total weight of the 3D printed polyvinylidene fluoride (PVDF)-based energetic material.

* * * * *